United States Patent [19]
Konosu et al.

[11] Patent Number: 6,039,256
[45] Date of Patent: Mar. 21, 2000

[54] OPTICAL INFORMATION READING APPARATUS HAVING DUST-PROOF PLATE

[75] Inventors: Koji Konosu, Anjo; Akio Sugiura, Nagoya; Kunihiro Motizuki, Fuji, all of Japan

[73] Assignee: Denso Corporation, Kariya, Japan

[21] Appl. No.: 09/176,433

[22] Filed: Oct. 21, 1998

[30] Foreign Application Priority Data

Oct. 27, 1997  [JP]  Japan ................................. 9-294446
Aug. 21, 1998  [JP]  Japan ................................ 10-235845

[51] Int. Cl.$^7$ ........................................................ G06K 7/10
[52] U.S. Cl. ............................. 235/462.43; 235/472.01
[58] Field of Search ........................ 235/462.43, 462.21, 235/462.22, 462.23, 472.01, 472.02, 462.01, 462.02, 462.44, 462.45

[56] References Cited

U.S. PATENT DOCUMENTS

| | | | |
|---|---|---|---|
| 4,460,120 | 7/1984 | Shepard et al. | 235/472 |
| 4,621,189 | 11/1986 | Kumar et al. | 235/472 |
| 4,825,057 | 4/1989 | Swartz | 235/472 |
| 4,916,441 | 4/1990 | Gombrich | 340/712 |
| 4,983,818 | 1/1991 | Knowles | 235/472 |
| 5,059,778 | 10/1991 | Zouzoulas et al. | 235/472 |
| 5,241,488 | 8/1993 | Chadima, Jr. et al. | 235/472 |
| 5,324,925 | 6/1994 | Koeneck et al. | 235/472 |
| 5,471,042 | 11/1995 | Kirkeby et al. | 235/472 |

FOREIGN PATENT DOCUMENTS

| | | | |
|---|---|---|---|
| 58-66452 | 5/1983 | Japan . | |
| 403248287A | 11/1991 | Japan | 235/472 |
| 9-179929 | 7/1997 | Japan . | |

*Primary Examiner*—Thien M. Le
*Attorney, Agent, or Firm*—Pillsbury Madison & Sutro LLP

[57] ABSTRACT

A dust-proof plate transmits light emitted by red light emitting diode unit. When the dust-proof plate reflects a part of the light, the reflected light incident on an image forming optical system becomes an optical noise in reading the image information of a reading object. In order to prevent the optical noise from being generated, an incident-side opening of a lens barrel is positioned proximately to the dust-proof plate. Thus, the light reflected from the dust-proof plate can be prevented from being introduced into the lens barrel.

14 Claims, 9 Drawing Sheets

FIG. IA
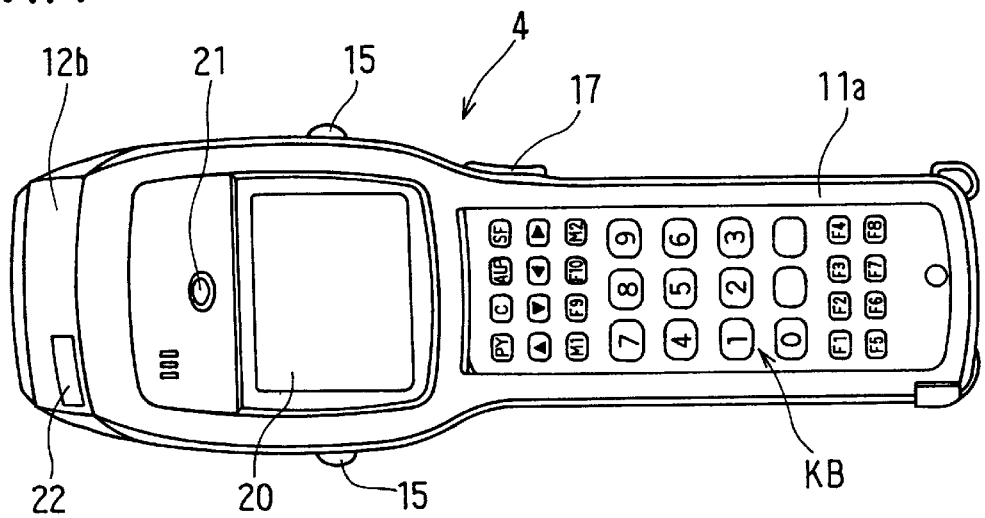
FIG. IB
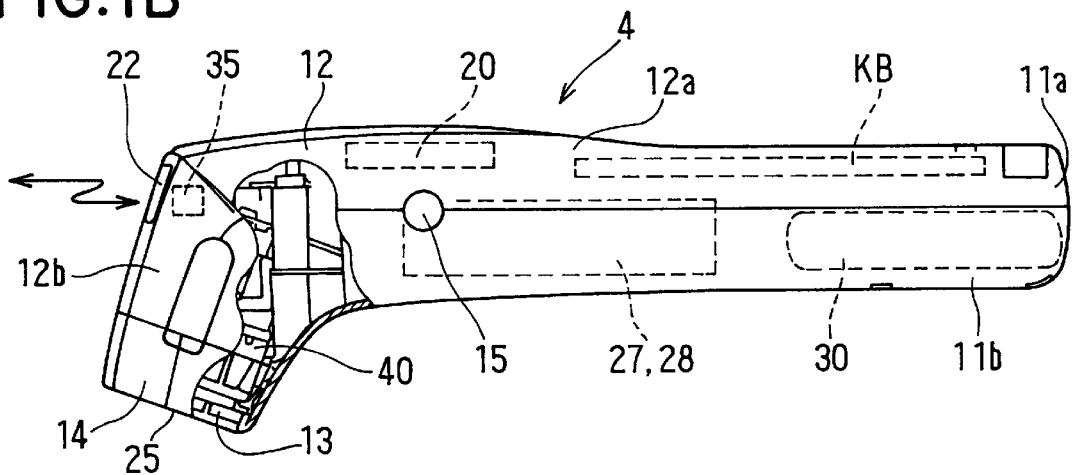
FIG. IC
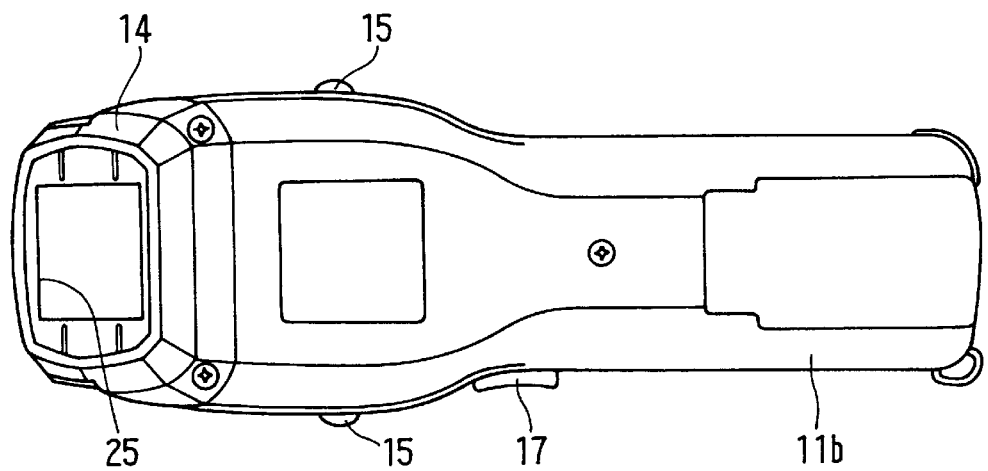

OPTICAL INFORMATION READING APPARATUS HAVING DUST-PROOF PLATE

CROSS REFERENCE TO RELATED APPLICATION

This application relates to and incorporates herein by reference Japanese Patent Applications No. 9-294446 filed on Oct. 27, 1997 and No. 10-235845 filed on Aug. 21, 1998.

BACKGROUND OF THE INVENTION

1. Field of the Invention

The present invention relates to an optical information reading apparatus that irradiates light to a reading object such as a bar code to read the image thereof through light reflected thereby. More particularly, the present invention relates to an optical information reading apparatus that has a dust-proof plate for preventing dust from penetrating into a case from a reading opening.

2. Description of Related Art

It is known that light emitted by a light emitting device such as a light emitting diode or the like is irradiated onto a bar code attached to goods. Light reflected from the bar code is focused on a predetermined reading position through an image forming optical system. A light receiving device such as a CCD (charge-coupled device) positioned at the reading position reads the image of the bar code.

Normally, in this kind of apparatus, light is irradiated onto a reading object such as a bar code from a reading opening formed on the case of the apparatus, and light reflected from the bar code is guided into the case from the reading opening to form the image of the bar code on the light receiving device. At a place positioned a little inward from the reading opening, there is provided a dust-proof plate to prevent the light emitting device, the light receiving device, and the image forming optical system from being subjected to dust. The dust-proof plate transmits the light emitted by the light emitting device therethrough. Thus, the light emitted by the light emitting device passes through the dust-proof plate, thus being irradiated to the bar code or the like located outside the case. Light reflected from the bar code enters into the case and passes through the dust-proof plate. The image forming optical system forms the image of the bar code on the light receiving device.

However, because the light emitted by the light emitting device is irradiated onto the reading object through the dust-proof plate, the light is partly reflected by the dust-proof plate. Incidence of the light reflected from the dust-proof plate on the image forming optical system prevents accurate reading of the image of the bar code, thus causing optical noise for the light reflected from the bar code or the like.

SUMMARY OF THE INVENTION

It is therefore an object of the present invention to provide an optical information reading apparatus capable of accurately reading optical information by preventing irradiation light reflected from a dust-proof plate from becoming an optical noise.

In an optical information reading apparatus according to a first aspect of the present invention, a dust-proof plate is located nearer to a reading opening than a light emitting device and a lens barrel in a case and transmits light emitted by the light emitting device. The light emitted by the light emitting device provided inside the case passes through the dust-proof plate, thus irradiating a reading object located outside the case through the reading opening of the case. Light reflected from the reading object is introduced into the lens barrel through the reading opening. An image forming optical system forms the image of the reading object on a light receiving device. The light reflected from the reading object enters into the lens barrel from an incident-side opening thereof and passes through the image forming optical system held inside the lens barrel, thus being guided to the light receiving device from an opening positioned at a transmitting-side opening.

In an optical information reading apparatus according to a second aspect of the present invention, a light emitting device and a light receiving device are so arranged that the light emitting device is present within a range of a total reflection angle$\theta 2$ ($=\theta 1$ of an angle$\theta 1$. It is assumed that an acute angle made between a maximum visual field of the light receiving device defined by an image forming optical system and a dust-proof plate is $\theta 1$. Thus, light emitted by the light emitting device and reflected from the dust-proof plate can be prevented from traveling to the light receiving device. Therefore, it is possible to prevent the light reflected from the dust-proof plate from becoming an optical noise, in addition to the dust-proof effect provided by the dust-proof plate.

Further, it is preferable that light emitted by the light emitting device from a position outside a range of the total reflection angle$\theta 2$ ($=\theta 1$) of the angle $\theta 1$ is intercepted by a light interception member and thus does not reach the dust-proof plate.

BRIEF DESCRIPTION OF THE DRAWINGS

Other objects and advantages of the present invention will become more apparent from the following detailed description made with reference to the accompanying drawings. In the drawings:

FIGS. 1A, 1B and 1C are a schematic plan view, a partly-broken side view and a bottom view of an optical information reading apparatus according to an embodiment of the present invention;

DETAILED DESCRIPTION OF THE PREFERRED EMBODIMENTS

Figure 2:
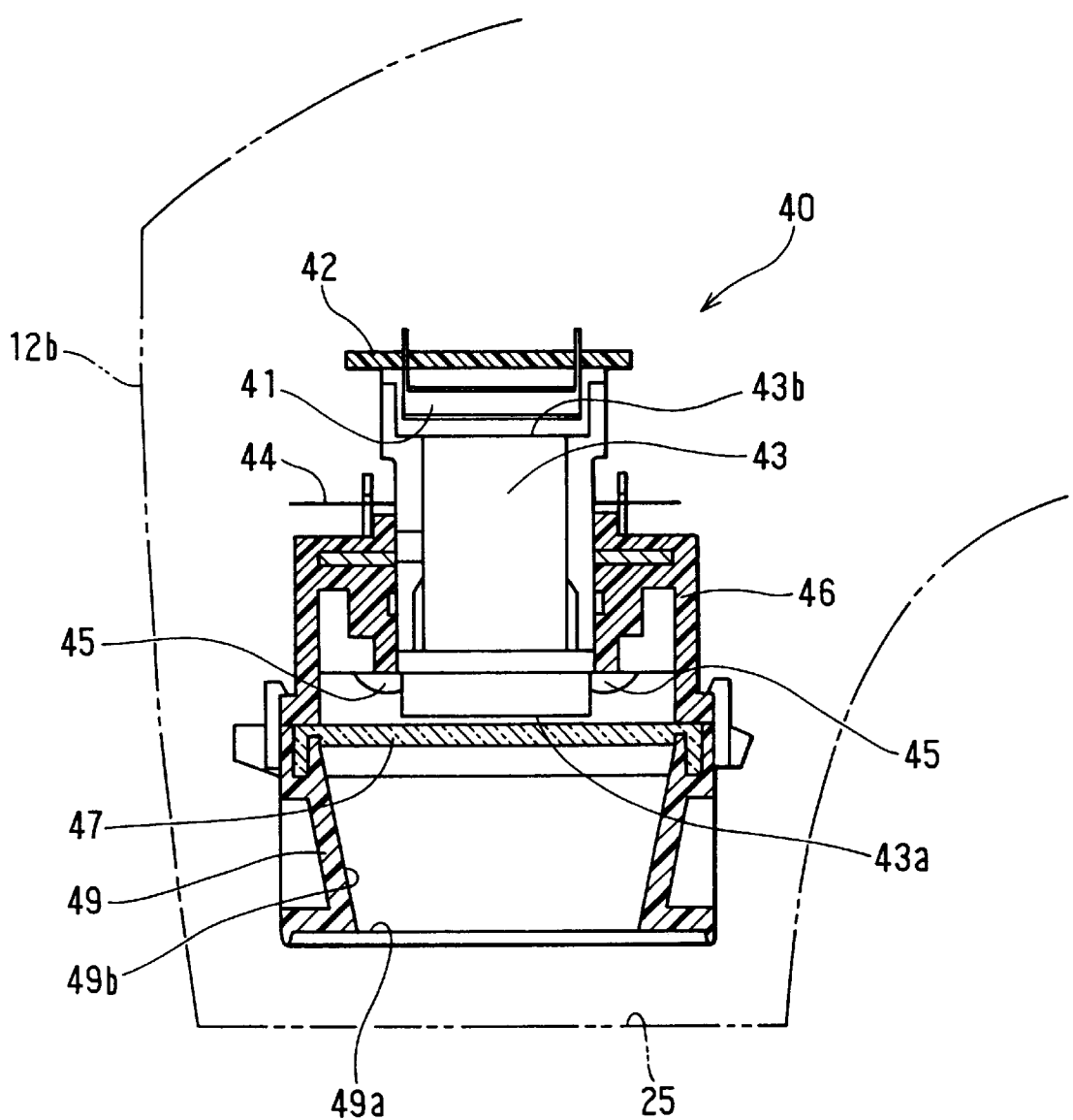
FIG. 2 is a schematic sectional view showing an optical module of the optical information reading apparatus according to the embodiment.
Figure 3:
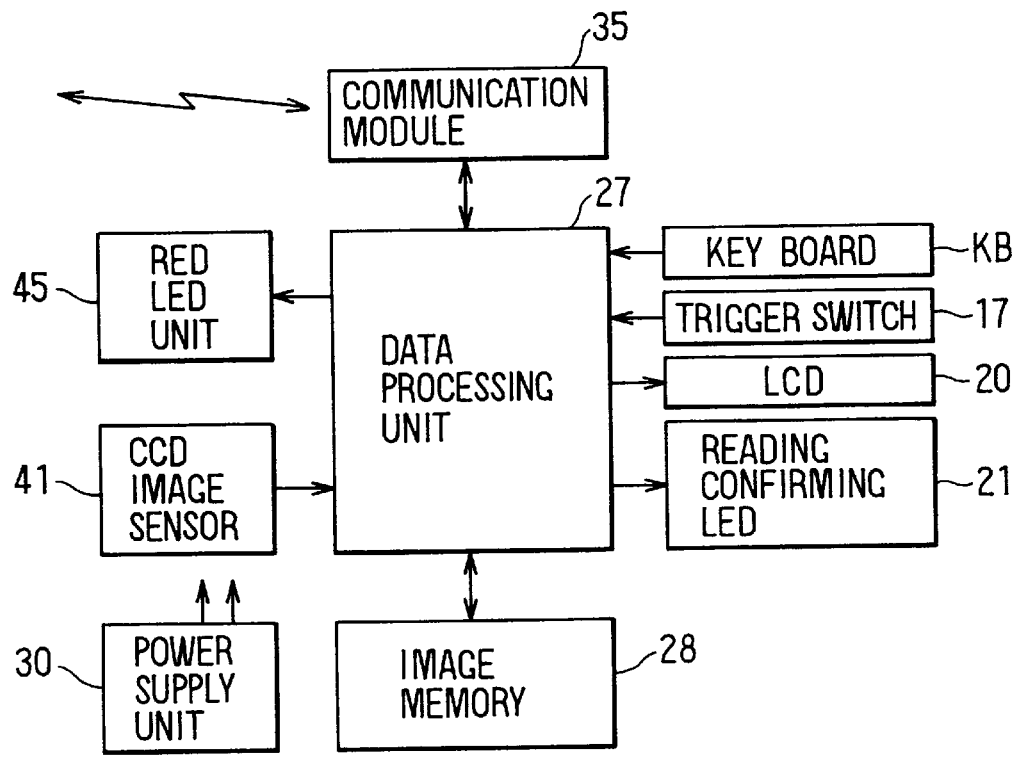
FIG. 3 is a block diagram showing a control system of the optical information reading apparatus according to the embodiment.

Referring to FIGS. 1A, 1B, 1C, 2 and 3, a hand-held portable optical information reading apparatus 4 comprises a case 12 having an upper case 11a and a lower case 11b and accommodating various components parts. The optical information reading apparatus 4 further comprises a body section 12a positioned at the rear part thereof and a head section 12b positioned at the front part thereof. The head section 12b is integral with the body section 12a and curved downward with respect to the body section 12a. The axis of the head section 12b inclines downward at about 70° with respect to the axis of the body section 12a.

The body section 12a functions as a part to be hand-gripped by an operator. On the upper surface of the body section 12a, there are installed a key board KB through which information is inputted manually, a liquid crystal display 20 for displaying a read two-dimensional code or the like, and a reading confirming LED (light emitting diode) 21 for confirming that the two-dimensional code has been read. A communication plate 22 for passing infrared light therethrough is installed on the head section 12b at a position proximate to the front end of the body section 12a. A reading opening 25 is formed at the front bottom end of the head section 12b.

The upper and lower cases 11a and the 11b are made of molded resin. At the front end of the head section 12b, there is installed an annular separation prevention holder 13 mounted on the upper and lower cases 11a and 11b to prevent the upper and lower cases 11a and 11b from being separated from each other. An annular rubber member 14 is attached on the separation prevention holder 13.

On the side surface of the body section 12a, a rubber member 15 for absorbing a drop-caused shock is positioned at both sides of the liquid crystal display 20 such that it projects from the side surface of the body section 12a and is fixedly sandwiched between the upper and lower cases 11a and 11b. A trigger switch button 17 is installed on one of the side surfaces of the body section 12a such that it is positioned beside the key board KB.

Inside the body section 12a, in addition to the key board KB, the liquid crystal display 20, and the reading confirming LED 21, there are provided a data processing unit 27, an image memory 28, and a power supply unit 30 accommodating a battery (not shown). Inside the head section 12b, there are provided a communication module 35 in opposition to the communication plate 22 and an optical module 40 positioned at approximately the center of the head section 12b.

To irradiate a reading object (not shown), the data processing unit 27 issues an instruction to a red light emitting diode unit 45 to emit irradiation light by actuating an emission driving circuit (not shown). Upon receipt of electric signals corresponding to light reflected from the reading object from a CCD image sensor 41, the data processing unit 27 amplifies and binarizes the electric signals and decodes data thus generated to obtain the information of the image of the reading object. The image memory 28 stores the information temporarily. Then, the information stored in the image memory 28 is transmitted to an external device (not shown) through the communication module 35. The communication module 35 communicates with the external device by a method conforming to the known IrDA (Infrared Data Association). The communication module 35 comprises a communication light emitting element that transmits data to the external device and a communication light receiving element receiving a signal (for example, program for operating system, command for baiting for communication) from the external device. The signal received by the communication light receiving element is applied to the data processing unit 27.

The outer configuration of the head section 12b is indicated by a two-dot chain line in FIG. 2 to show the approximate position of the optical module 40 accommodated inside the head section 12b.

The optical module 40 comprises the CCD image sensor (light receiving device) 41, a lens barrel 43, the red light emitting diode (light emitting device), a dust-proof plate 47 for preventing dust from penetrating into the optical module 40, and an irradiation range limitation member 49. The CCD image sensor 41 is at the remotest position from the reading opening 25 positioned at the front end of the head section 12b. The lens barrel 43, the dust-proof plate 47, and the irradiation range limitation member 49 are arranged farther from the reading opening 25 in this order. The red light emitting diode unit 45 is positioned on the periphery of the lens barrel 43.

The lens barrel 43 is substantially cylindrical and accommodates an image forming lens, a diaphragm, and the like constituting an image forming optical system. Reflection light from the reading object that has entered into the head section 12b from the reading opening 25 of the head section 12b is incident to an incident-side opening 43a and then, passes through the image forming optical system accommodated inside the lens barrel 43, thus traveling to the CCD image sensor 41 from a transmitting-side opening 43b.

The CCD image sensor 41 is installed on a sensor substrate 42 and located at the position at which the image of the reading object is formed by the image forming optical system accommodated inside the lens barrel 43. The CCD image sensor 41 has a plurality of light receiving charge coupled devices arranged two-dimensionally. The CCD image sensor 41 converts the image of the reading object photo-electrically into the electric signals indicating the pattern of the image of the reading object, thus outputting the electric signals to the data processing unit 27 (FIG. 1).

As described above, the red light emitting diode unit 45 is positioned on the periphery of the lens barrel 43. In this embodiment, four diodes are arranged as the red light emitting diode unit 45 on the periphery of the substantially cylindrical lens barrel 43 at angular intervals of about 90°. More specifically, the red light emitting diode unit 45 is installed on an LED substrate 44 and held by an LED holder 46. Only two of the four diodes are shown in FIG. 2.

Because the dust-proof plate 47 is nearer to the reading opening 25 than the lens barrel 43 and the red light emitting diode unit 45, the dust-proof plate 47 prevents dust from penetrating into the lens barrel 43 and the red light emitting diode unit 45 from the reading opening 25. The dust-proof plate 47 transmits red light which is the reading light (irradiation light) emitted by the red light emitting diode unit 45.

The dust-proof plate 47 transmits the light emitted by the red light emitting diode unit 45. A part of the light is reflected from the dust-proof plate 47. If the light reflected thereby is incident to the image forming optical system, it becomes an optical noise for the light reflected by the reading object, thus lessening accurate reading of the optical information of the reading object. In the embodiment, in order to prevent the generation of such an optical noise, the incident-side opening 43a of the lens barrel 43 is positioned proximately to the dust-proof plate 47 to prevent the light reflected from the dust-proof plate 47 from traveling into the lens barrel 43. The incident-side opening 43a may be located in contact with the dust-proof plate 47.

The irradiation range limitation member 49 interposed between the dust-proof plate 47 and the reading opening 25 is cylindrical. An opening 49a is formed at the reading opening-positioned side of the irradiation range limitation member 49 to limit the range of the light emitted by the red light emitting diode unit 45. More specifically, the angle of an inner wall 49b of the irradiation range limitation member 49 is so formed that the inner wall 49b prevents the reflected light emitted by the red light emitting diode unit 45 from traveling into the lens barrel 43. Further, the size of the opening 49a of the irradiation range limitation member 49 is so set that the irradiation range of the light limited by the opening 49a is equal to a maximum image range which can be read by the CCD image sensor 41 or larger than that by a predetermined amount.

Figure 4A:
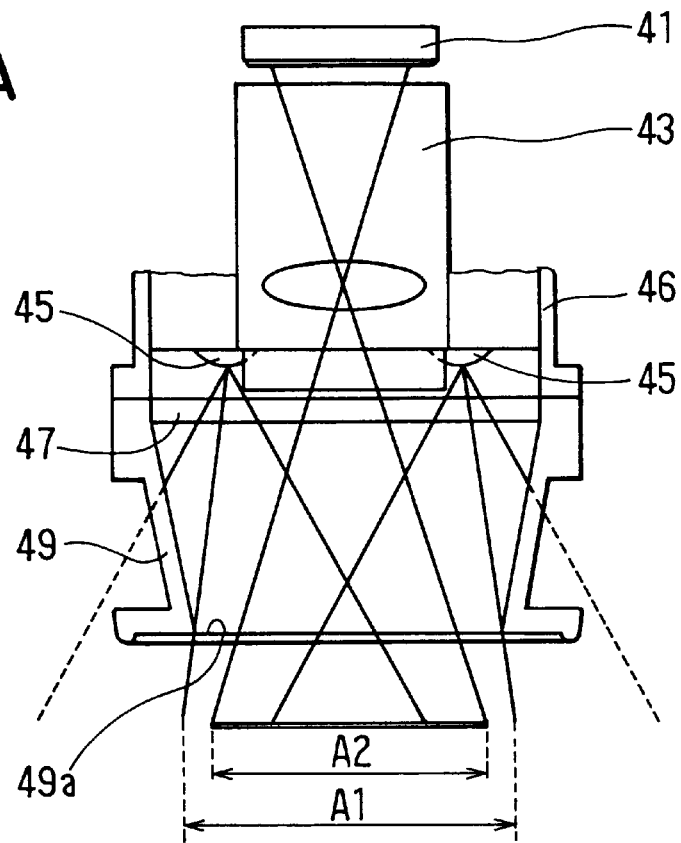
FIGS. 4A and 4B are explanatory views showing the limitation of an irradiation range of light that is made by an irradiation range limitation member of the optical information reading apparatus according to the embodiment.
Figure 4B:
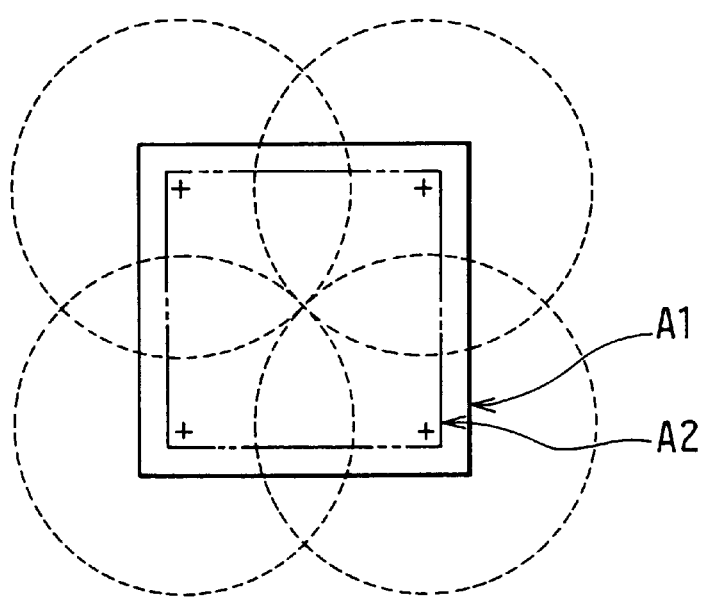

Referring to FIGS. 4A and 4B, the limitation of the irradiation range of the light performed by the irradiation range limitation member 49 is further described below. The red light emitting diode unit 45 is positioned on the periphery of the lens barrel 43, namely, on the periphery of the image forming optical system accommodated inside the lens barrel 43. Thus, in the case where the irradiation range of the light is not limited by the irradiation range limitation member 49, as shown by dotted lines in FIG. 4B, the irradiation range of the light emitted by each illumination red light emitting diode unit 45 forms a circle which overlaps with adjacent circles. The irradiation range limitation member 49 limits the irradiation range to a range corresponding to the configuration of the opening 49a thereof. In the embodiment, because the opening 49a is square, the limited irradiation range A1 of the light emitted by the illumination red light emitting diode unit 45 is square, as shown by a solid line in FIG. 4B. The area of the limited irradiation range A1 is set to be a little larger than that of a readable maximum image range A2 shown by a two-dot chain line. Mark "+" in FIG. 4B denotes the center of irradiation of light from each diode of the light emitting diode unit 45. The reason the limited irradiation range A1 is formed squarely is because a two-dimensional code which is to be read is square.

Figure 5A:
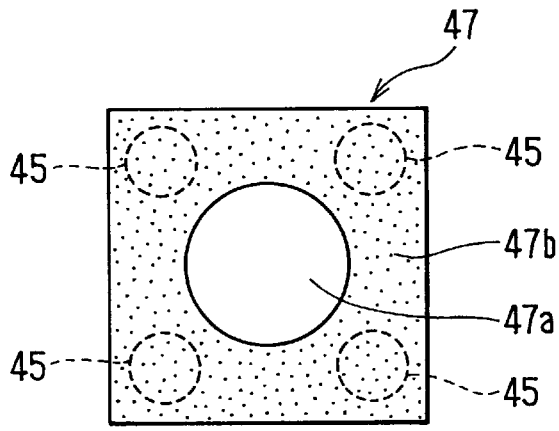
FIGS. 5A and 5B are explanatory views showing a diffusion surface and a transparent surface of a dust-proof plate of the optical information reading apparatus according to the embodiment.
Figure 5B:
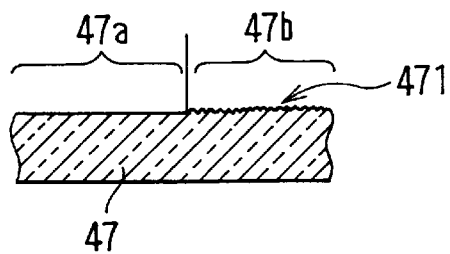

In the embodiment, the dust-proof plate 47 is so constructed that the illuminance of the light whose irradiation range is limited by the irradiation range limitation member 49 is as uniform as possible in the irradiation range. As shown in FIG. 5A, a central part of the dust-proof plate 47 is formed to be transparent to provide a transparent surface 47a and the rest is formed to provide a light diffusion surface 47b. The circles shown by the dotted lines indicate positions of the diodes. The transparent surface 47a is formed in opposition to the incident-side opening 43a (FIG. 2) of the lens barrel 43, and the transparent surface 47a is formed in the region of the dust-proof plate 47 other than the region of the transparent surface 47a. As shown in FIG. 5B, to diffuse the light emitted by the red light emitting diode unit 45, tiny irregularities 471 are formed on a surface (surface facing the lens barrel 43) of the diffusion surface 47b.

As shown in FIG. 5A, the diffusion surface 47b confronts the red light emitting diode unit 45, thus diffusedly irradiating the light emitted by the red light emitting diode unit 45 to allow the illuminance of the light inside the limited irradiation range A1 shown in FIG. 4B to be as uniform as possible. This construction allows the reading object to be irradiated at a possible uniform illuminance. The reason the region opposed to the incident-side opening 43a of the lens barrel 43 is not formed as the diffusion surface 47b but as the transparent surface 47a is as follows. That is, the optical amounts of light rays reflected from respective portions of the reading object are different from one another according to densities of images of the respective portions thereof. Thus, the information of the images of the reading object cannot be read when the light rays reflected from the reading object are diffused by the diffusion surface 47b.

Figure 6A:
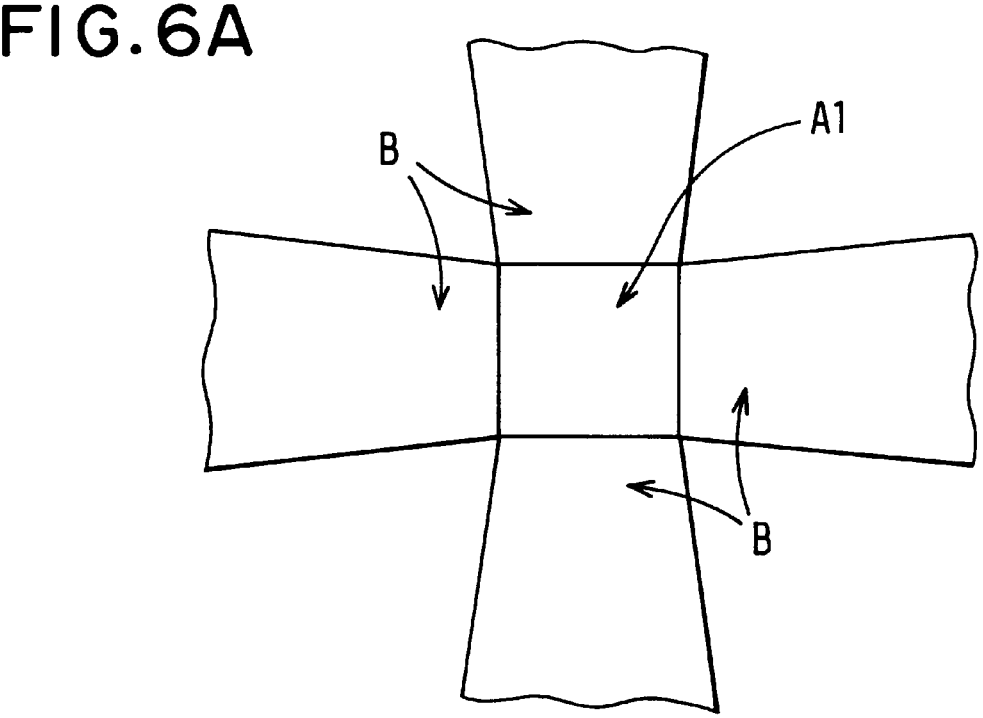
FIGS. 6A and 6B are explanatory views showing an irradiation range of indirect illumination light generated by the irradiation range limitation member of the optical information reading apparatus according to the embodiment.

As described above, the angle of the inner wall 49b of the irradiation range limitation member 49 is so formed that the inner wall 49b prevents the reflected light emitted by the red light emitting diode unit 45 from traveling into the lens barrel 43. The light reflected from the inner wall 49b, namely, indirect illumination light leaks out from the opening 49a and is irradiated to the outside of the optical information reading apparatus 4 from the reading opening 25a. That is, as shown in FIG. 6A, the irradiation range B of the indirect illumination light is present in the peripheral four directions of the irradiation range A1 of the limited irradiation range of the direct illumination light emitted by the red light emitting diode unit 45. More specifically, because the irradiation range A1 of the direct illumination light is square, the irradiation range B of the indirect illumination light is present on the periphery of the irradiation range A1 such that the irradiation range B extends widthwise and lengthwise from the four sides of the irradiation range A1. The brightness of the indirect illumination light inside the irradiation range B becomes decreasingly low, as the indirect illumination light is more distant from the irradiation range A1 of the direct illumination light.

In operation, when the trigger switch button 17 is pressed by an operator, the data processing unit 27 starts reading processing. Upon receipt of a signal from the data processing unit 27, light is emitted by the illumination red light emitting diode unit 45. The light is diffused by the diffusion surface 47b (FIG. 5B) when it passes through the dust-proof plate 47. Limited in its irradiation range by the irradiation range limitation member 49, the light travels to the reading object positioned outside the case 12 from the reading opening 25 of the case 12, thus irradiating it. As shown in FIG. 4B, the area of the limited irradiation range A1 is set to be a little larger than that of the readable maximum image range A2. Thus, whether or not the information of the image of the reading object can be accurately read is determined according to whether the reading object is positioned at the center of the irradiation range of the light. That is, the operator can adjust the position and direction of the optical information reading apparatus 4 so that the reading object is positioned at the center of the irradiation range of the light.

Figure 6B:
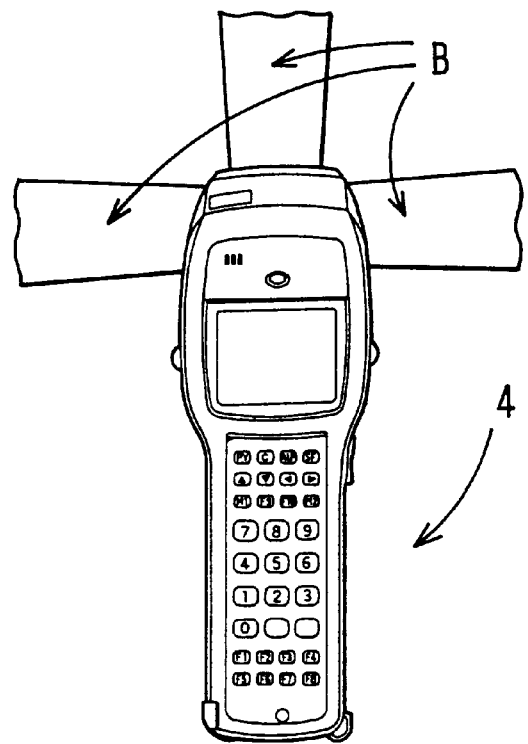

As shown in FIGS. 6A and 6B, the irradiation range A1 of the direct illumination light is present at the intersection portion of the irradiation range B of the indirect illumination light extending widthwise and the irradiation range B of the indirect illumination light extending lengthwise. Thus, whether the light emitted by the red light emitting diode unit 45 irradiates the reading object accurately can be indirectly decided by the irradiation range B of the indirect illumination light. Hence, the operator can use the optical information reading apparatus 4 conveniently. That is, in order to place the reading object within the irradiation range A1 of the direct illumination light, it is necessary for the operator to adjust the position and direction of the optical information reading apparatus 4 while the operator is watching the irradiation range. Because the irradiation range A1 of the direct illumination light is opposed to the reading opening 25, the operator is required to check the presence of the irradiation range A1 by looking it down. The irradiation range B of the indirect illumination light is present on the periphery of the irradiation range A1 such that the irradiation range B extends widthwise and lengthwise from the periphery thereof. Thus, the operator can confirm the irradiation range B of the indirect illumination light without looking it down. Accordingly, as shown in FIG. 6B, the operator can easily adjust the position and direction of the optical information reading apparatus 4 so that the reading object is located at the intersection portion of the irradiation range B of the indirect illumination light extending widthwise and the irradiation range B of the indirect illumination light extending lengthwise. Thus, the operator can use the optical information reading apparatus 4 conveniently.

On the other hand, the light reflected from the reading object enters into the case 12 through the reading opening 25, thus entering into the lens barrel 43 through the dust-proof plate 47. At this time, the light reflected from the reading object passes through the transparent surface 47*a* (FIG. 5B) of the dust-proof plate 47, thus entering into the lens barrel 43. The reflected light has optical amounts different from one another according to the densities of images of respective portions of the reading object. Thus, it is possible to read the information of the image of the reading object accurately.

The reflected light travels to the CCD image sensor 41 from the image forming optical system, accommodated inside the lens barrel 43, by which the image of the reading object has been formed. The CCD image sensor 41 produces the electric signal to the data processing unit 27. The data processing unit 27 decodes the image information of the reading object, thus transmitting the information obtained by the decoding to the image memory 28. The information stored by the image memory 28 is displayed on the liquid crystal display 20.

Figure 7A:
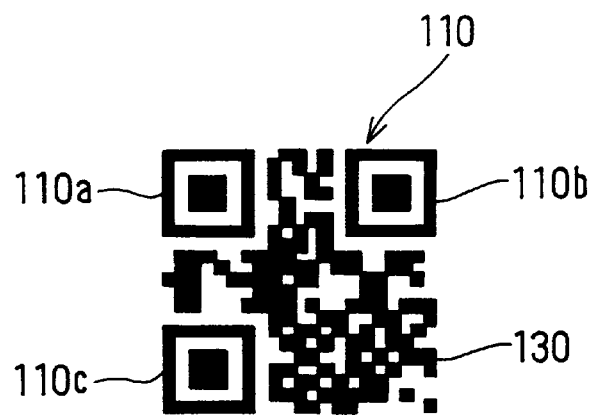
FIGS. 7A, 7B and 7C are explanatory views showing a simplified display, of a two-dimensional code in the embodiment.
Figure 7B:
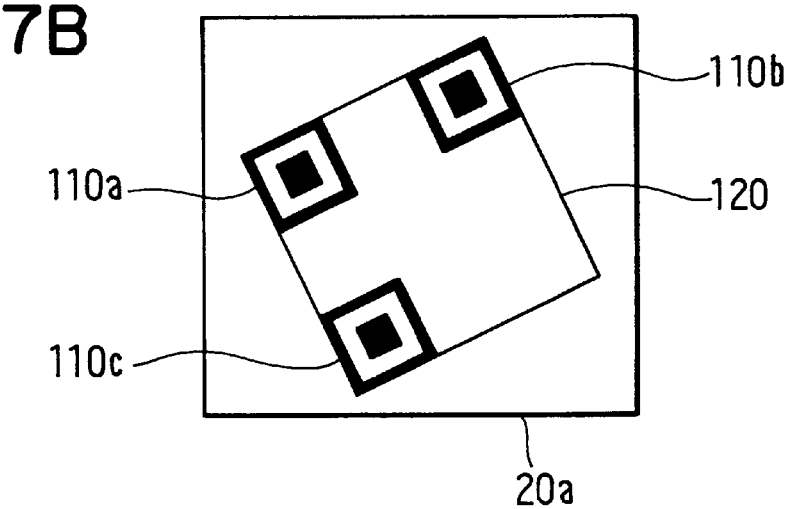
Figure 7C:
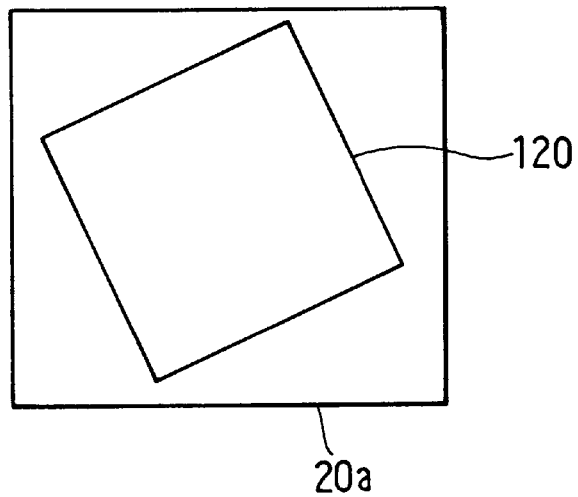

In the embodiment, the image of a two-dimensional code 110 shown in FIG. 7A can be displayed on the liquid crystal display 20 as a simplified image, as shown in FIG. 7C. In the two-dimensional code 110 shown in FIG. 7A, each of three positioning symbols 110*a*, 110*b*, and 110*c* each consisting of squares combined with one another in a specific size proportion is positioned at each of three of the four apexes or corners of the two-dimensional code 110, and a pattern of substantial data 130 is positioned in the region other than the region of the three positioning symbols 110*a*, 110*b*, and 110*c*. The two-dimensional code 110 is formed as a square.

In the simplified display of the two-dimensional code 110 shown in FIG. 7B, only the three positioning symbols 110*a*, 110*b*, and 110*c* and an outer line 120 showing the entire size of the two-dimensional code 110 are displayed on the liquid crystal display 20, whereas the substantial data 130 is not displayed thereon. In the simplified display shown in FIG. 7C, the three positioning symbols 110*a*, 110*b*, and 110*c* are not displayed on the liquid crystal display 20 and only the outer line 120 showing the entire size of the two-dimensional code 110 is displayed thereon. Whether the image of the two-dimensional code 110 can be read properly is determined according to whether the region of the two-dimensional code 110 which is determined by the outer line 120 is displayed entirely on a display screen 20*a* of the liquid crystal display 20. Thus, the operator can use the optical information reading apparatus 4 conveniently.

When the image information of the reading object is appropriately decoded, the reading confirming LED 21 is turned on. The reading confirming LED 21 is turned off in a predetermined period of time.

The optical information reading apparatus 4 of this embodiment described above displays the following effects.

(1) In order to prevent the light emitted by the red light emitting diode unit 45 from being introduced into the lens barrel 43 when the light is reflected from the dust-proof plate 47, the incident-side opening 43*a* of the lens barrel 43 is positioned proximately to the dust-proof plate 47. Therefore, it is possible to prevent the light reflected from the dust-proof plate 47 from becoming optical noise, in addition to the dust-proof effect provided by the dust-proof plate 47. Thus, this arrangement is effective for reading the optical information of the image of the reading object accurately.

(2) When the light emitted by the illumination red light emitting diode unit 45 passes through the diffusion surface 47*b* of the dust-proof plate 47, it is diffusedly irradiated onto the reading object. Thus, the reading object can be irradiated with the light at a uniform illuminance. The light reflected from the reading object enters into the lens barrel 43 through the transparent surface 47*a* of the dust-proof plate 47. Therefore, the optical information of the image of the reading object can be accurately read.

(3) The optical module 40 accommodates the CCD image sensor 41, the lens barrel 43, the red light emitting diode unit 45, the dust-proof plate 47, and the irradiation range limitation member 49 held together as a unit. Thus, it is easy to combine these members with one another in consideration of the position of the CCD image sensor 41 which is determined by the image forming position of the image forming optical system inside the lens barrel 43, in consideration of the position of the red light emitting diode unit 45 and the emission direction thereof, and in consideration of the positional relationship between the dust-proof plate 47 and the lens barrel 43 to prevent the light emitted by the illumination red light emitting diode unit 45 and reflected from the dust-proof plate 47 from traveling into the lens barrel 43. On the other hand, in installing component parts separately inside the case 12, it is necessary to adjust the installing position of each component part with respect to the case 12 in consideration of the above positional relationship. In this respect, when the component parts are held together to compose the optical module 40, it is possible to combine the component parts with each other by deciding the positional relationship among the component parts directly.

(4) The irradiation range limitation member 49 limits the irradiation range of the light emitted by the red light emitting diode unit 45. Whether the image information of the reading object can be read accurately or not is decided according to whether the reading object is positioned at the center of the limited irradiation range A1 of the direct illumination light. Thus, the operator can use the optical information reading apparatus 4 conveniently.

Further, as shown in FIGS. 7A to 7C, the simplified display of the two-dimensional code on the liquid crystal display 20 allows the operator to decide whether the image information of the reading object can be accurately read.

(5) It is easy to decide whether the light is applied to the reading object appropriately by so adjusting the position and direction of the entire optical information reading apparatus 4 that the reading object is located at the intersection portion of the irradiation range B of the indirect illumination light extending widthwise and the irradiation range B of the indirect illumination light extending lengthwise.

(6) The axis of the head section 12*b* inclines downward with respect to the axis of the body section 12*a*. Thus, gripping the body section 12*a*, the operator can perform an operation of reading the image information of the reading object placed in parallel with the axis of the body section 12*a* with improved operability. In the embodiment, the axis of the head section 12b inclines downward at about 70° with respect to the axis of the body section 12a. The inclination of the axis of the head section 12b with respect thereto is need not be 70°. It is preferable to set the inclination of the axis of the head section 12b with respect thereto in consideration of the following point. That is, in reading the image information of the reading object placed in parallel with the axis of the body section 12a, distortion becomes increasingly large as the inclination of the axis of the head section 12b with respect thereto is close to 0°. On the other hand, as the inclination of the axis of the head section 12b with respect thereto is close to 90°, the influence of specular reflection becomes increasingly large, which may make it impossible to read the image information of the reading object in high probability. When the operator grasps the head section 12b, it is appropri.ate to set the inclination of the axis of the head section 12b with respect thereto to an angle proximate to 45° in consideration of the operability of the optical information reading apparatus 4.

In consideration of the above and because the optical information reading apparatus 4 is to read the image information of the two-dimensional code, the inclination of the axis of the head section 12b is set to about 70° with respect to the axis of the body section 12a to prevent occurrence of distortion. When the image information of a one-dimensional code is read, influence of distortion is small. Thus, it is preferable to set the inclination of the axis of the head section 12b with respect thereto to about 0°–45° to prevent the influence of specular reflection and improve operability.

(7) Because the optical module 40 accommodating the red light emitting diode unit 45 and the CCD image sensor 41 is installed inside the head section 12b, the following secondary effects can be obtained.

(7a) Provided that the CCD image sensor 41 is positioned in the body section 12a, when the axis of the head section 12b inclines downward with respect to the axis of the body section 12a, it is necessary to alter an optical path by using a reflection mirror to guide the reflected light from the reading opening 25 of the head section 12b to the CCD image sensor 41 positioned in the body section 12a. In the embodiment, because the optical module 40 accommodating the CCD image sensor 41 is installed inside the head sec-ion 12a, it is unnecessary to provide the optical information reading apparatus 4 with a member such as a reflection mirror for altering the optical path. It is very effective to eliminate the optical path-altering member such as the reflection mirror from the optical information reading apparatus 4. That is, the optical information reading apparatus 4 can be simplified in its entire construction and reduced in its size. In particular, in the embodiment, the reading object is a two-dimensional code and the two-dimensional CCd image sensor 41 consisting a plurality of light receiving charge coupled devices (CCD) arranged two-dimensionally is adopted. Thus, it is necessary to use a large reflection mirror for altering the optical path and provide the two-dimensional CCd image sensor 41 with the space for the optical path extending to the image forming optical system, if the optical module 40 is not adopted in the embodiment.

(7b) Because the optical information reading apparatus 4 of the embodiment is of a portable cordless type, a battery is accommodated in the power supply unit 30. In this case, the optical module 40 is installed inside the head section 12a, whereas component parts such as the battery other than the optical module 40 are accommodated in the body section 12a so that the entire optical information reading apparatus 4 is balanced well in its weight and the like.

It is to be understood that the optical information reading apparatus 4 may be used to read a one-dimensional code such as a bar code. The optical information reading apparatus 4 can read the one-dimensional code with the same effect as that obtained in reading the two-dimensional code.

The diffusion surface 47b (FIG. 5B) of the dust-proof plate 47 may be provided by installing an irregularities-formed separate member on the dust-proof plate 47.

The dust-proof plate 47 for preventing the reflected light from becoming an optical noise may be modified as follows.

(First Modification)

Figure 8:
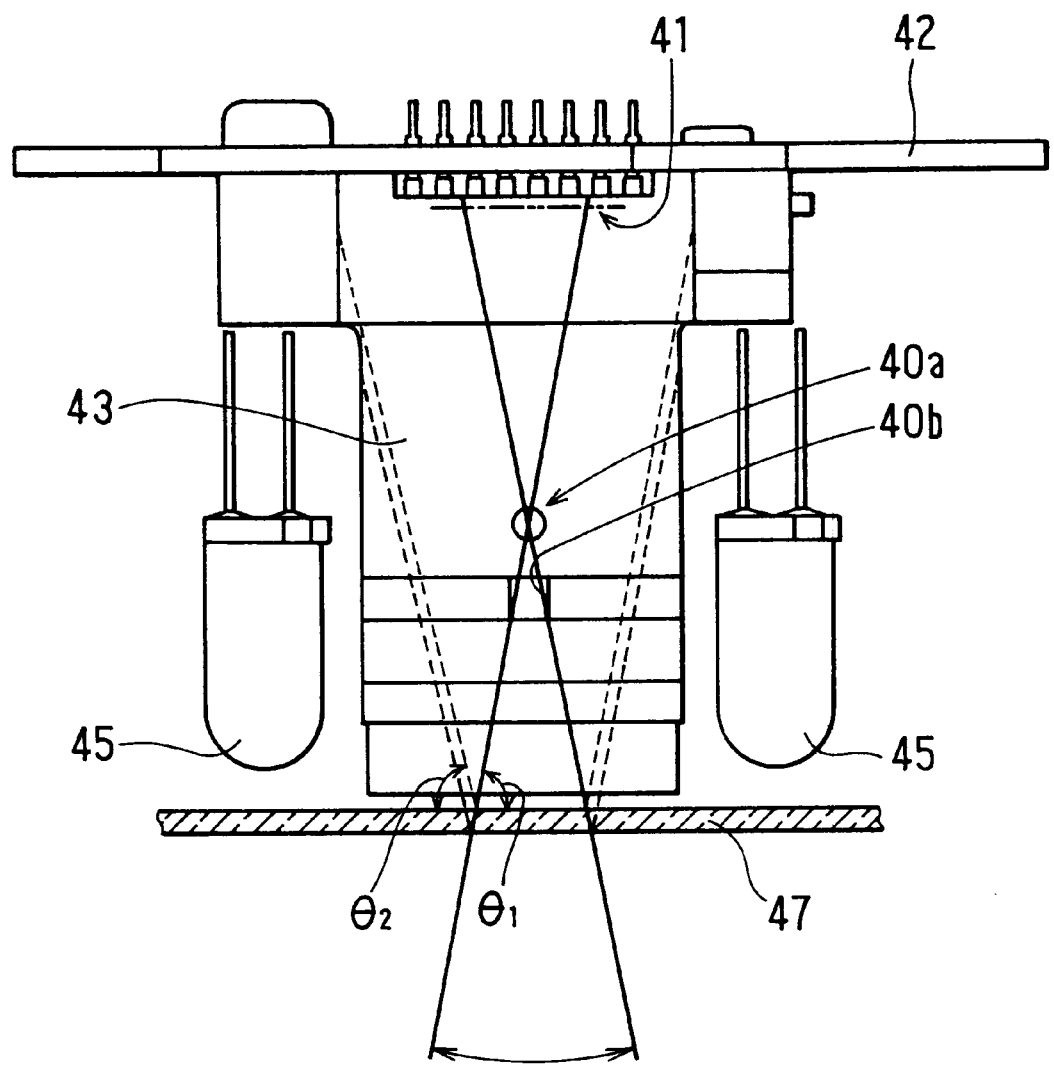
FIG. 8 is a schematic view showing an optical module according to a first modification of the embodiment.

As shown in FIG. 8, the lens barrel 43 accommodates an image forming optical system such as an image forming lens 40a, an iris diaphragm 40b, and the like. The maximum visual field X of the CCD image sensor 41 serving as the light receiving device is defined by the image forming optical system. In the first modification, supposing that an acute angle made between the maximum visual field X of the CCD image sensor 41 and the dust-proof plate 47 is $\theta 1$, the red light emitting diode unit 45 serving as the light emitting device and the CCD image sensor 41 are so arranged that the red light emitting diode unit 45 is present within the range of the total reflection angle$\theta 2$ of the angle$\theta 1$. The total reflection angle$\theta 2$ is equal to the angle$\theta 1$ made between the maximum visual field X of the CCD image sensor 41 and the dust-proof plate 47 ($\theta 1 = \theta 2$).

Thus, when the illumination light emitted by the red light emitting diode unit 45 is reflected from the dust-proof plate 47, the reflected light does not reach the CCD image sensor 41. Therefore, it is possible to prevent the light reflected from the dust-proof plate 47 from becoming an optical noise, in addition to the dust-proof effect provided by the dust-proof plate 47. Thus, the construction is very effective for reading the optical information of the image of the reading object accurately.

(Second Modification)

Figure 9:
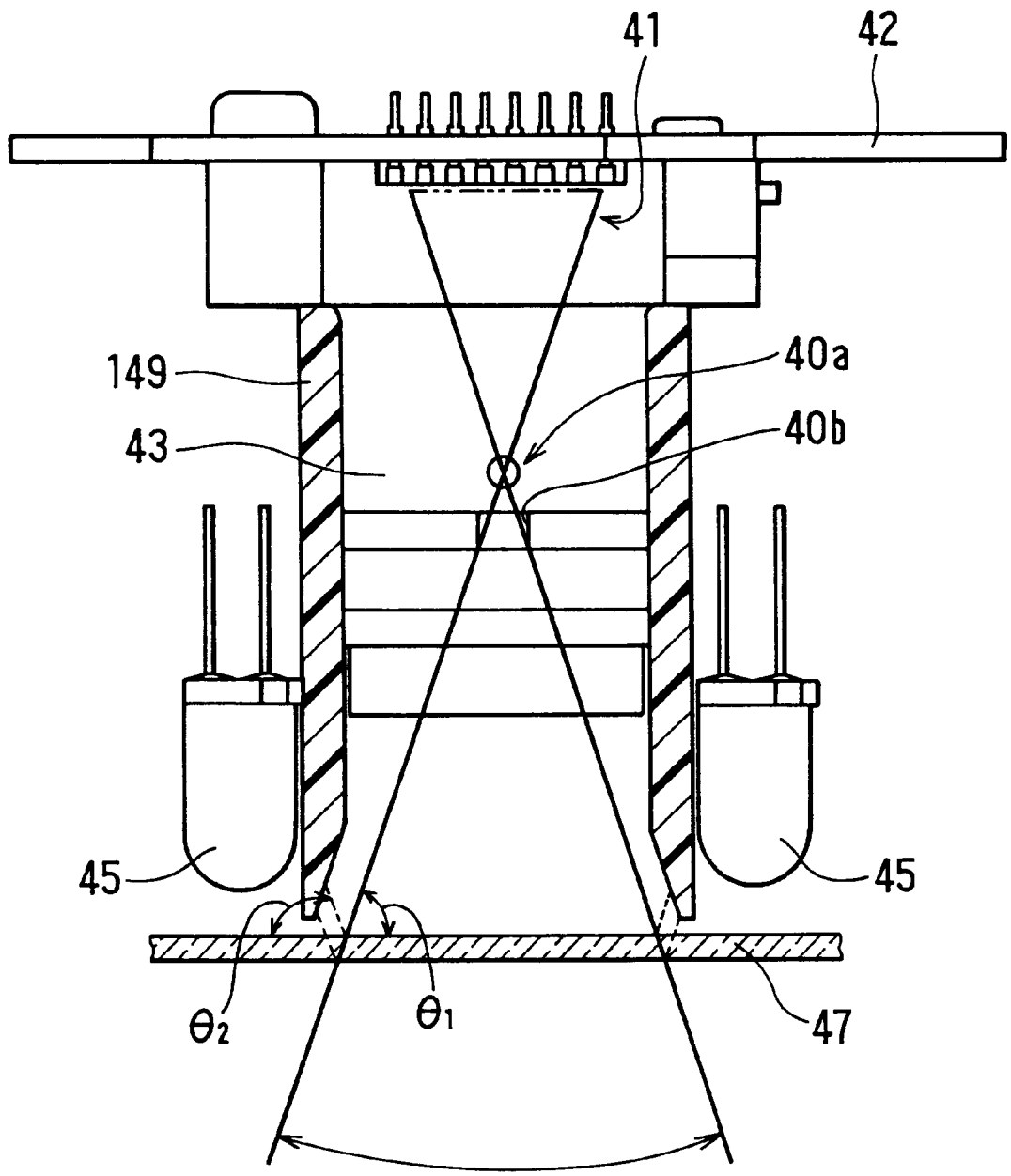
FIG. 9 is a schematic view showing an optical module according to a second modification of the embodiment.

As shown in FIG. 9, a light interception member 149 is interposed between the red light emitting diode unit 45 and the lens barrel 43 accommodating the image forming optical system 40a, 40b as well as the CCD image sensor 41.

Figure 10:
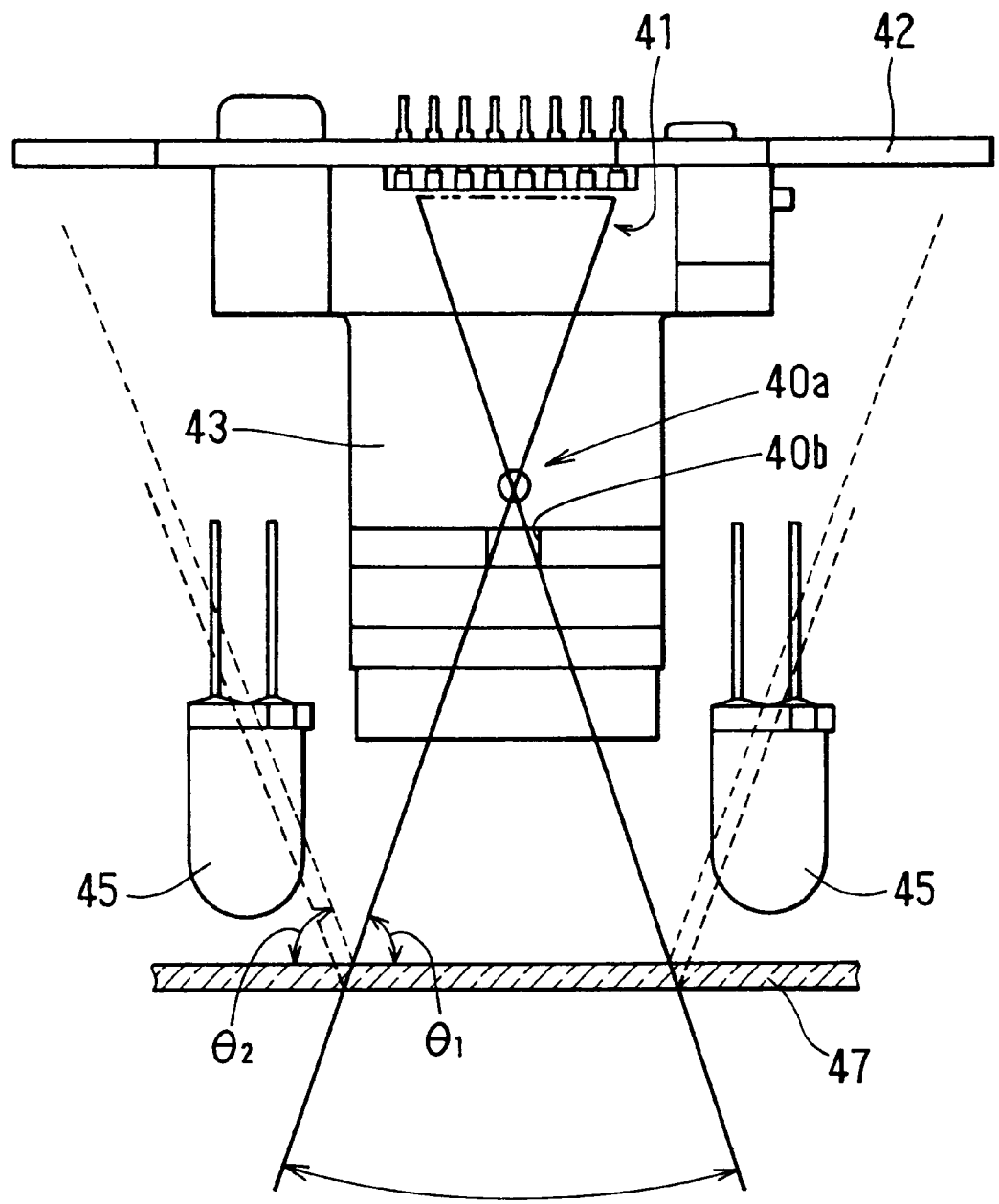
FIG. 10 is a schematic view showing an optical module for comparison with the second modification.

Without the light interception member 149, there is a possibility that the light emitted by the red light emitting diode unit 45 from a position outside the range of the total reflection angle$\theta 2$ of the angle$\theta 1$ made between the maximum visual field X of the CCD image sensor 41 and the dust-proof plate 47 is reflected from the dust-proof plate 47 and reaches the CCD image sensor 41 as shown in FIG. 10. In order to prevent occurrence of such a problem, in this modification, the light interception member 149 is provided to intercept the light emitted by the red light emitting diode unit 45 from a position outside the range of the total reflection angle$\theta 2$ so that the light is not reflected from the dust-proof plate 47, as shown in FIG. 9. That is, because the light which may be reflected from the dust-proof plate 47 and may reach the CCD image sensor 41 is intercepted to prevent it from reaching the dust-proof plate 47. Accordingly, this construction makes it possible to prevent the light reflected from the dust-proof plate 47 from becoming an optical noise, in addition to the dust-proof effect provided by the dust-proof plate 47.

As described above, the construction of the optical information reading apparatus 4 of the second modification is effective if the construction of the first modification (FIG. 8) cannot be adopted. That is, the second modification has the following advantages.

When the position of the red light emitting diode unit 45 serving as the light emitting device and that of the CCD image sensor 41 serving as the light receiving device are adjusted to obtain the above effect, the position of the red light emitting diode unit 45 and that of the CCD image sensor 41 are limited. When the position of the light interception member 149 is adjusted to obtain the above effect, the freedom degree of the position of the red light emitting diode unit 45 and that of the CCD image sensor 41 can be improved.

It is to be understood that the present invention should not be limited to the disclosed embodiment and its modifications, but may be modified further without departing from the spirit of the invention.

What is claimed is:

1. An optical information reading apparatus for reading an image of a reading object comprising:

a case having a reading opening;

a light receiving device accommodated in the case;

a light emitting device positioned inside the case for irradiating light to the reading object located outside the case through the reading opening of the case;

an image forming optical system positioned in the case for introducing light reflected from the reading object through the reading opening and forming an image of the reading object on the light receiving device;

a lens barrel having an incident-side opening and a transmitting-side opening and holding the image forming optical system therein, the lens barrel being for guiding light reflected from the reading object into the case from the incident-side opening thereof, and sending the reflected light which has passed the image forming optical system to the light receiving device from the transmitting-side opening; and a dust-proof plate, located nearer to the reading opening than the light emitting device and the lens barrel, for transmitting the light emitted by the light emitting device therethrough and preventing dust from penetrating into the light emitting device and the lens barrel from the reading opening, wherein the incident-side opening of the lens barrel is placed proximately to the dust-proof plate to prevent the light emitted from the light emitting device and reflected from the dust-proof plate from traveling into the lens barrel.

2. The apparatus according to claim 1, wherein:

the incident-side opening of the lens barrel is in contact with the dust-proof plate.

3. The apparatus according to claim 1, wherein:

the dust-proof plate has a diffusion surface formed thereon to diffuse light emitted by the light emitting device, except a portion thereof facing the incident-side opening of the lens barrel.

4. The apparatus according to claim 3, wherein:

the diffusion surface has tiny irregularities on a surface of the dust-proof plate.

5. The apparatus according to claim 1, wherein:

the dust-proof plate is positioned proximately to the reading opening.

6. The apparatus according to claim 1, wherein:

the light emitting device, the light receiving device, the lens barrel holding the image forming optical system therein, and the dust-proof plate are integrated together to form an optical module.

7. The apparatus according to claim 1, further comprising:

a cylindrical irradiation range limitation member interposed between the dust-proof plate and the reading opening to limit an irradiation range of light emitted by the light emitting device by means of an opening of the irradiation range limitation member positioned at a side of the reading opening, wherein an angle of an inner wall of the irradiation range limitation member is so set that when light emitted by the light emitting device is reflected, the reflected light does not enter into the lens barrel; and a size of the opening of the irradiation range limitation member positioned at the side of the reading opening is so set that an irradiation range of the light limited by the opening is equal to or larger by a predetermined amount than a maximum range of an image readable by the light receiving device.

8. The apparatus according to claim 7, wherein the opening positioned at the reading opening of the irradiation range limitation member is square.

9. The apparatus according to claim 8, wherein:

the irradiation limitation member is so shaped that indirect illumination light generated by reflection of light emitted by the light emitting device from the inner wall of the irradiation range limitation member leaks outside from the square opening positioned at the side of the reading opening such that an irradiation range of the indirect illumination light is present in peripheral four directions of a square irradiation range of the emitted light limited by the square opening.

10. The apparatus according to claim 8, wherein:

the light emitting device has four light emitting diodes each of which is arranged as a spot light source on a periphery of the lens barrel; and an optical axis of each of the four light emitting diodes is positioned in correspondence with each of four corners of the square opening of the irradiation range limitation member positioned at the reading opening side thereof.

11. The apparatus according to claim 7, wherein:

the light emitting device, the light receiving device, the lens barrel holding the image forming optical system therein, the dust-proof plate, and the irradiation range limitation member are integrated to form an optical module.

12. The apparatus according to claim 6, wherein:

the case has a head section having the reading opening and inclined at a predetermined angle with respect to a body section functioning as a gripping portion; and the optical module is provided inside the head section.

13. An optical information reading apparatus for reading an image of a reading object comprising:

a case having a reading opening;

a light receiving device accommodated in the case;

a light emitting device positioned inside the case for irradiating light to the reading object located outside the case through the reading opening of the case;

an image forming optical system positioned in the case for introducing light reflected from the reading object through the reading opening and forming an image of the reading object on the light receiving device;

a dust-proof plate located nearer to the reading opening than the light emitting device for transmitting the light emitted by the light emitting device therethrough, and preventing dust from penetrating into the light emitting device from the reading opening, wherein the light emitting device and the light receiving device are so arranged that the light emitting device is present within a range of a total reflection angle $\theta 2$ ($=\theta1$) of an acute angle $\theta1$ made between a maximum visual field of the light receiving device defined by the image forming optical system and the dust-proof plate.

14. An optical information reading apparatus for reading an image of a reading object comprising:

a case having a reading opening;

a light receiving device accommodated in the case;

a light emitting device positioned inside the case for irradiating light to the reading object located outside the case through the reading opening of the case;

an image forming optical system positioned in the case for introducing light reflected from the reading object through the reading opening and forming an image of the reading object on the light receiving device;

a dust-proof plate located nearer to the reading opening than the light emitting device for transmitting the light emitted by the light emitting device therethrough, and preventing dust from penetrating into the light emitting device from the reading opening; and a cylindrical light interception member interposed between the image forming optical system as well as the light receiving device and the light emitting device and intercepting the light emitted by the light emitting device from a position outside a range of a total reflection angle $\theta2$ ($=\theta1$) of an acute angle $\theta1$ made between a maximum visual field of the light receiving device defined by the image forming optical system and the dust-proof plate by an opening formed at a side of the reading opening so that the light emitted from the position outside the range is prevented from being reflected from the dust-proof plate.

* * * * *